Figures 1, 2:
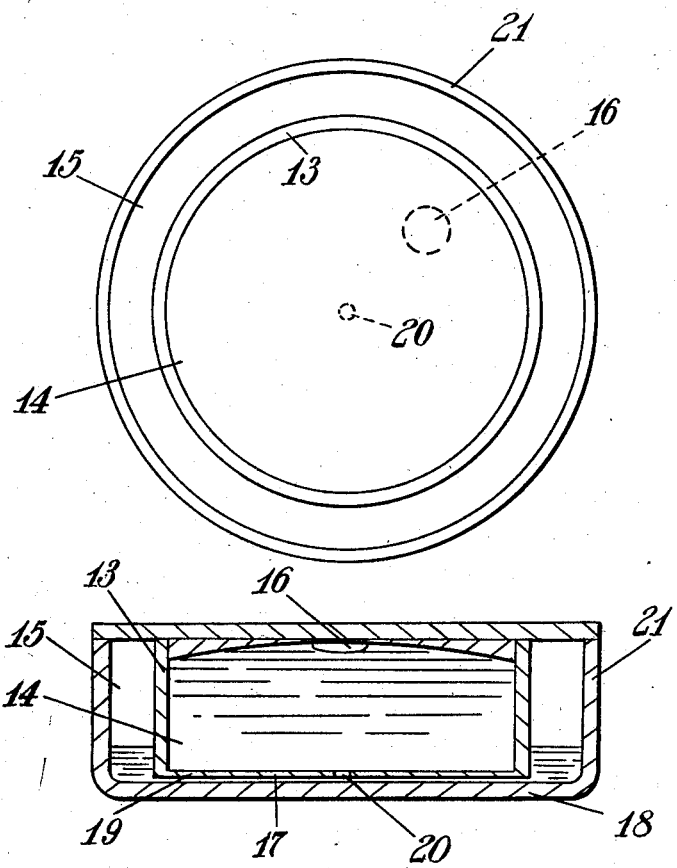

April 25, 1950 A. WOOD 2,505,166
SPIRIT LEVEL
Filed June 19, 1946

Inventor
A. Wood

Patented Apr. 25, 1950

2,505,166

UNITED STATES PATENT OFFICE 2,505,166

SPIRIT LEVEL

Albert Wood, London, England, assignor, by mesne assignments, to Hilger & Watts Limited, London, England Application June 19, 1946, Serial No. 677,744
In Great Britain July 25, 1945

1 Claim. (Cl. 33—212)

This invention relates to spirit levels of the kind having a small circular or approximately circular bubble or air bell and an air reservoir communicating by a small passage with the liquid in the main body of the level, which may be of circular form.

Spirit levels of the above kind (but without the reservoir) suffer from the disadvantage that expansion or contraction of the liquid due to temperature changes causes a change in the air space of the bubble or air bell, which accordingly varies in size and sometimes involves such a change that the size of the bubble or air bell is reduced almost to disappearing point. Circular levels, due to the increased proportion of the volume of liquid to that of the air forming the bubble or air bell, are particularly susceptible to the above conditions, thereby imposing a limitation upon the size of the level and the uses for which the same can be employed, the circular spirit levels as at present employed being commonly made only in small sizes.

The invention has for its object to provide a spirit level of the above kind which is free from the above disadvantages and permits circular spirit levels in particular to be made in larger sizes than is usual and be applied to a greater range of uses.

According to the invention a spirit level of the above kind is provided wherein the liquid chamber is in communication with an outer chamber which permits movement of the liquid to compensate for expansion and contraction thereof and contains a seal for preventing escape of air from the liquid chamber.

Thus in accordance with the invention a spirit level of the above kind is provided with additional enclosed space to that normally occupied by the liquid which additional space permits movement of the liquid to compensate for expansion and contraction thereof due to changes of temperature and atmospheric pressure without however involving any loss or change of the air forming the bubble or air bell, whereby a predetermined size of bubble or air bell remains substantially constant.

A circular spirit level may be provided having a central circular chamber containing the main body of liquid and the air bubble or air bell and bounded by an outer chamber in communication with the main body of liquid through the medium of a restricted passageway in which the liquid is free to flow by capillary attraction.

In the accompanying drawings:

Figure 1 is a plan view of a form of circular spirit level in accordance with the invention, and Figure 2 is a central vertical section of Figure 1.

Referring now, more particularly, to the accompanying drawings, in which similar reference numerals designate corresponding parts throughout the several views, the spirit level consists of a circular casing 12 containing an inner concentric wall 13 which divides the interior of the casing into a central circular chamber 14 and an outer annular chamber 15.

The central chamber 14 contains the liquid and the air bell or bubble 16 and the bottom 17 of the central chamber is spaced slightly from the bottom 18 of the casing to provide a capillary passageway 19 which communicates with the annular chamber 15 and also with the central chamber 14 via a small hole 20 in the bottom of the latter whereby a flow of liquid between these two chambers is permitted by capillary action and the annular chamber therefore is able to function as an expansion chamber.

The arrangement is such that a small quantity of the liquid spirit is contained in the annular chamber 15 and the capillary attraction between the bases 17 and 18 provides for a continuous flow of spirit between these surfaces whereby the communicating hole 20 is always covered with spirit, notwithstanding the orientation or disposition of the bubble. The arrangement therefore provides for a breathing action of the spirit due to changes of temperature or atmospheric pressure and denies the access of extra air into the central chamber 14 on contraction, or the egress of the contained air on expansion.

I claim:

A spirit level comprising an inner circular hollow vessel constituting a bubble chamber containing the main body of fluid and situated within and concentric with an outer circular sealed hollow vessel so as to form an annular expansion chamber around the bubble chamber which is partly filled with liquid, the outer surface of the bottom of the inner vessel and the inner surface of the bottom of the outer vessel being spaced from one another to form a passage of capillary dimensions between and over the bottoms of the vessels and a hole in the bottom of the inner vessel substantially in the centre thereof communicating between the inner vessel and the capillary passage to allow of the expansion or contraction of the liquid in the bubble chamber without entrance or egress of air thereto or therefrom.

ALBERT WOOD.

REFERENCES CITED

The following references are of record in the file of this patent:

UNITED STATES PATENTS

| Number | Name | Date |
|---|---|---|
| 1,828,194 | Lietz | Oct. 20, 1931 |
| 1,885,428 | Gallasch | Nov. 1, 1932 |
| 1,902,387 | Van Hofe et al. | Mar. 21, 1933 |
| 2,017,900 | Grant | Oct. 22, 1935 |
| 2,069,065 | Hand | Jan. 26, 1937 |
| 2,350,612 | Houseman | June 6, 1944 |
| 2,406,211 | Flint | Aug. 20, 1946 |

FOREIGN PATENTS

| Number | Country | Date |
|---|---|---|
| 149,854 | Great Britain | June 14, 1920 |